(No Model.)  R. H. AVERY.  2 Sheets—Sheet 1.
CORN PLANTER.
No. 276,745.  Patented May 1, 1883.
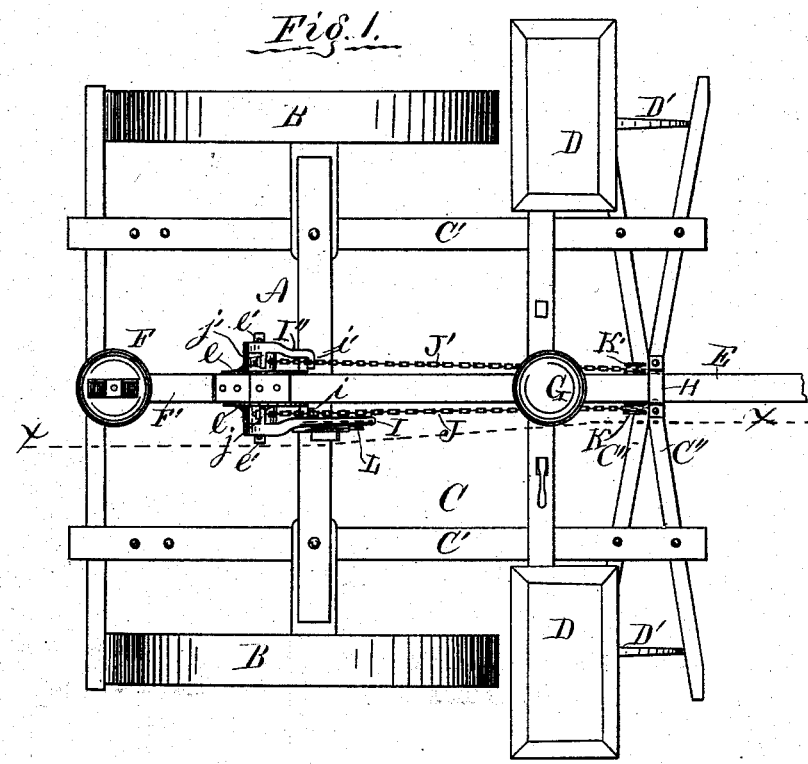
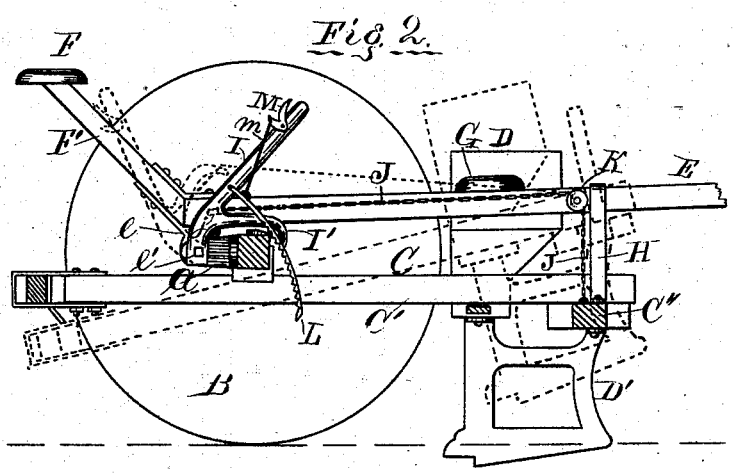
Witnesses:
P. R. Richards.
J. R. Campbell
Inventor:
Robt. H. Avery
By W. B. Richards (No Model.) 2 Sheets—Sheet 2.
R. H. AVERY.
CORN PLANTER.
No. 276,745. Patented May 1, 1883.
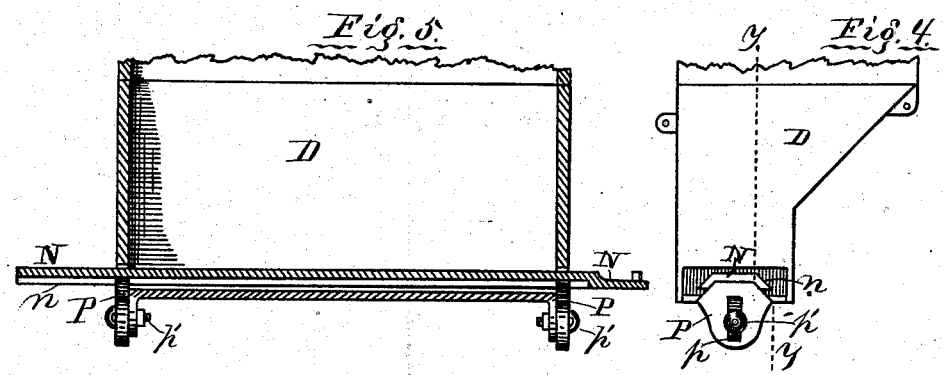
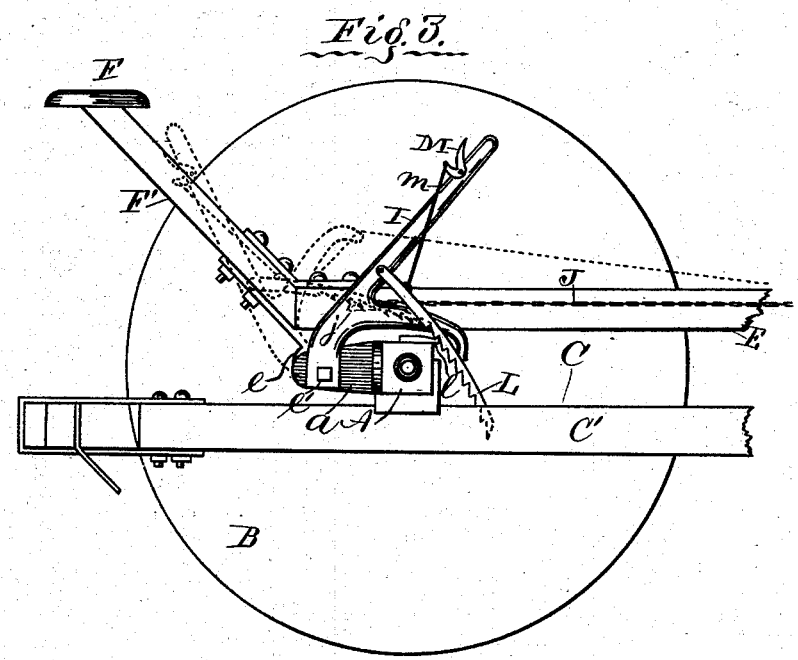
Witnesses:
J. R. Richards.
J. R. Campbell
Inventor:
Robt. H. Avery,
By W. B. Richards,
Atty.

UNITED STATES PATENT OFFICE.

ROBERT H. AVERY, OF GALESBURG, ILLINOIS, ASSIGNOR OF ONE-HALF TO CYRUS M. AVERY, OF SAME PLACE.

CORN-PLANTER.

SPECIFICATION forming part of Letters Patent No. 276,745, dated May 1, 1883.

Application filed October 31, 1882. (No model.)

*To all whom it may concern:*

Be it known that I, ROBERT H. AVERY, a citizen of the United States, residing at Galesburg, in the county of Knox and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a top plan. Fig. 2 is a sectional elevation in the line $x\,x$ in Fig. 1. Fig. 3 is an enlarged side elevation, illustrating details of a principal feature of my invention. Fig. 4 is an enlarged end elevation of one seed-box. Fig. 5 is a sectional elevation in the line $y\,y$ in Fig. 4.

This invention relates to two principal features of improvement, one feature of which has reference to means of raising and lowering the seeding devices in that class of planters shown in the Patent No. 199,344, granted to me January 15, 1878, and the other feature has reference to providing adjustable ways for the seed-slides of all classes of planters which use seed-slides.

The invention consists in constructions and combinations hereinafter described and claimed.

Referring to the drawings by letters, the same letter indicating the same part in the different figures, A represents the axle; B, the wheels; C, a frame formed of bars C' C'' and bolted to the axle near its rear end, and having the seed-boxes D and runners D' attached to its forward end. E is the draft-pole, having ears $e$ at its rear end, through which an axial bolt, $e'$, passes, by which the draft-pole is hinged to standards $a$, which project in rear of the axle, to permit of raising and lowering the forward end of the frame C, while the draft-pole remains stationary. F is the driver's seat, secured to seat-bar F', which projects upward and rearward from the rear end of the draft-pole. G is a dropman's seat.

H is a yoke attached at its lower ends to the bars C''. The tongue E passes through the yoke H.

The parts hereinbefore described by reference-letters to the drawings are substantially the same as the corresponding parts shown in my Patent No. 199,344, and need not be any more fully described herein, as their coaction and functions are the same as described fully in said patent, except as modified by my improvements hereinafter described.

I is a lever secured at its lower end to the bolt $e'$, so that as the lever is swung back or forth the bolt $e'$ will be oscillated with the movements of the lever.

I' is an arm attached to and extending forward from near the lower end of the lever I. The outer end of the arm I' has a laterally-projecting lug or toe, $i$.

J is a chain or cord attached at one end to the lever I at a point, $j$, near the basal end of the arm I', and, extending forward, passes over a pulley, K, which is journaled on the side of the draft-pole, and, thence extending downward, is connected at its front end to the forward end of the frame C.

On the opposite end of the bolt $e'$ from the lever I is secured an arm, I'', which projects upward and forward in about same plane as the arm I', and has a laterally-projecting toe or lug, $i'$, at its forward end, which lies in same horizontal plane and same vertical plane transversely to the machine as the toe $i$. A chain or cord, J', is attached at one end to the arm I' at a point, $j'$, directly opposite the attachment of the chain J to the lever I. The chain J' extends forward over a pulley, K', which is journaled on the side of the draft-pole, and thence downward, and is connected at its forward end to the front end of the frame C.

L is a curved swinging latch-bar, with ratchet-teeth on its concave side, and is hinged at its upper end to the lever I, and is held by its own gravity in engagement with a catch, $l$, which projects from the axle A.

M is an elbow-shaped thumb-lever pivoted to the upper end of lever I, and connected by a rod, $m$, with the latch-bar L. When the lever I is drawn backward to raise the forward end of the frame C, the ratchet-teeth on the latch-bar L will slide over the catch l, and when the movement of the lever is stopped one of said teeth will engage with the catch and retain the lever in position against forwardly-acting force. When it is desired to swing the lever I forward to lower the front end of the frame C, the latch-bar L may be raised from the catch l by means of the thumb-lever M by first drawing the lever slightly rearward.

The depth of penetration of the soil by the runners D', and consequently the depth of planting the seed, may be controlled by swinging the lever I forward and backward, and fixing it in position, after such adjustment, by engagement of the ratchet-tooth latch-bar L with the catch l. In swinging the lever I rearward from its lower forward positions the chains J J' will first be acted upon by their attachments j j' to the lever I and arm I', respectively, and the distance from said attachments to the fulcrum e' being short will enable the operator to raise the frame C from its lower positions and the runners D' from the soil without the exercise of much force. When the lever I is swung backwardly a few degrees and the runners D' are elevated slightly above the surface of the soil, less force will be required to elevate them still higher, and the lugs i i' will then come in contact with the chains J J', and, the distance of the lugs i i' from the fulcrum e' being greater than the distance therefrom of the points of attachment j j', less force can be exerted by means of the lever in raising the forward end of frame C, but the extent of upward movement of the runners D' will be increased relatively to the extent of rearward swing of the lever in the latter portion of its throw, and the rate of upward movement of the frame C relatively to the rate of movement of the lever be also increased in the latter part of the rearward throw of the lever. In fact, the lever I is a lever of the second kind, in which the weight acts thereon at a point, j, near the fulcrum of the lever during the first portion of the swing of said lever rearward, and changes to a point, i, farther from the fulcrum of the lever during the latter portion of the same swing thereof.

The arm I' and chain J' may be dispensed with; but I prefer to use them, as the two chains will tend to raise the runners more uniformly than one chain.

N is a seed-slide, which may be constructed as shown or in any ordinary manner. P are bearing-blocks or slideways, on which the slide N moves back and forth. The contact-surfaces between the blocks P and slide N may be of any desired form; but I prefer having a descending inclined ledge, n, lengthwise of and on each under side of the slide, which ledges fit against the corresponding sides of the blocks P, and thereby align the movements of the slide. The blocks P have slots p, through which bolts p' pass to secure them to any suitable part of the seed-box. The blocks P are adjustable, and can be retained, after adjustment, by the bolts p'. As the seed-slide and its bearing or slideway become worn the slideways P can be adjusted to compensate for wear, and to retain the slide in a horizontal position in the hopper, and always in the same path through the hopper.

When the frame C is elevated by the lever I entirely above the surface of the ground, for turning the machine, for local transportation on its own wheels, or for other purposes, it is held in said position by the latch-bar L engaging with the catch l.

What I claim as new is—

1. In a corn-planter, in combination with a frame carrying the seed-boxes and runners at its forward end, and hinged at its rear end to permit swinging its forward end in a vertical plane while the draft-pole remains in a fixed position, a lever fulcrumed convenient to the driver's seat, and a chain or cord extending from said lever to the forward end of the swinging frame, whereby the front end of said swinging frame may be raised and lowered, substantially as and for the purpose specified.

2. In a corn-planter, in combination with a frame, C, which swings in a vertical plane and carries the seeding devices, and a draft-pole which may remain fixed while the frame C is oscillated, a lever and chain, one end of the chain attached to the lever and its other end to the swinging frame, and the lever adapted to act on the chain during one portion of its throw at a point more distant from its fulcrum than the attachment of the chain thereto, substantially as and for the purpose specified.

3. In combination with the swinging frame C and draft-pole E, the chain J and lever I, having an arm, I', with a lug, i, adapted to act on the chain J during a portion of the throw of said lever, substantially as and for the purpose specified.

4. In combination with the swinging frame C, draft-pole E, and chains J J', the lever I, having an arm, I', with a lug, i, and the arm I'', having a lug, i', both of said lugs adapted to act simultaneously on the chains J J', substantially as and for the purpose specified.

5. In combination with a swinging frame, C, draft-pole E, chain J, and lever I, the ratchet-toothed bar L and catch l, adapted to hold the lever and thereby support the frame C, substantially as and for the purpose specified.

6. In a corn-planter, in combination with the seed-box and seed-slide, adjustable slideway-blocks P for the seed-slide, substantially as and for the purpose specified.

7. The seed-slide N, having ledges n on its under side, in combination with slideways fitted to the bottom of the seed-slide and to said ledges, whereby the movements of the seed-slide are aligned, substantially as described.

8. In combination with swinging frame C, draft-pole E, chain J, lever I, ratchet-bar L, and catch l, the thumb-lever M and rod m, substantially as and for the purpose specified.

9. In combination with the swinging frame C, draft-pole E, pulleys K, and chains J, the lever I, having an arm, I', with a lug, i, adapted to act on the chain J during a portion of the throw of said lever, substantially as and for the purpose specified.

10. In combination with the swinging frame C, draft-pole E, pulley K, and chain J, the lever I, adapted to act with varying force on and varying relative rate of movement with reference to the chain J, substantially as and for the purpose specified.

11. In combination with the swinging frame C, draft-pole E, and chain J, the lever I, adapted to act with varying force upon and varying relative rate of movement with reference to the chain J, substantially as and for the purpose specified.

In testimony whereof I affix my signature in presence of two witnesses.

ROBERT H. AVERY.

Witnesses:
SAML. N. GROSE,
W. B. RICHARDS.